June 17, 1924.
W. L. McGRATH
TRANSMISSION MECHANISM
Filed Oct. 24, 1921
1,497,729
2 Sheets-Sheet 2
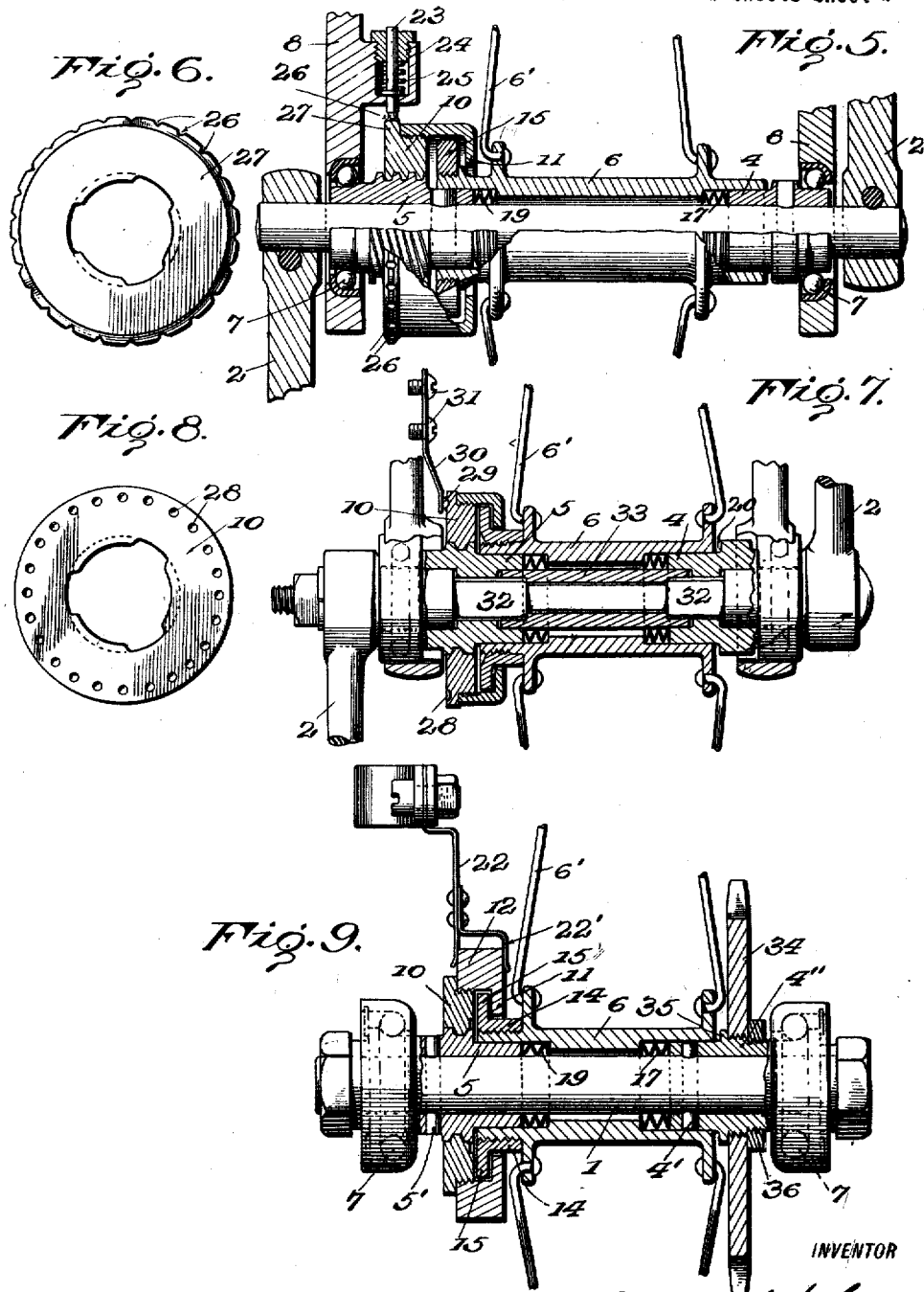

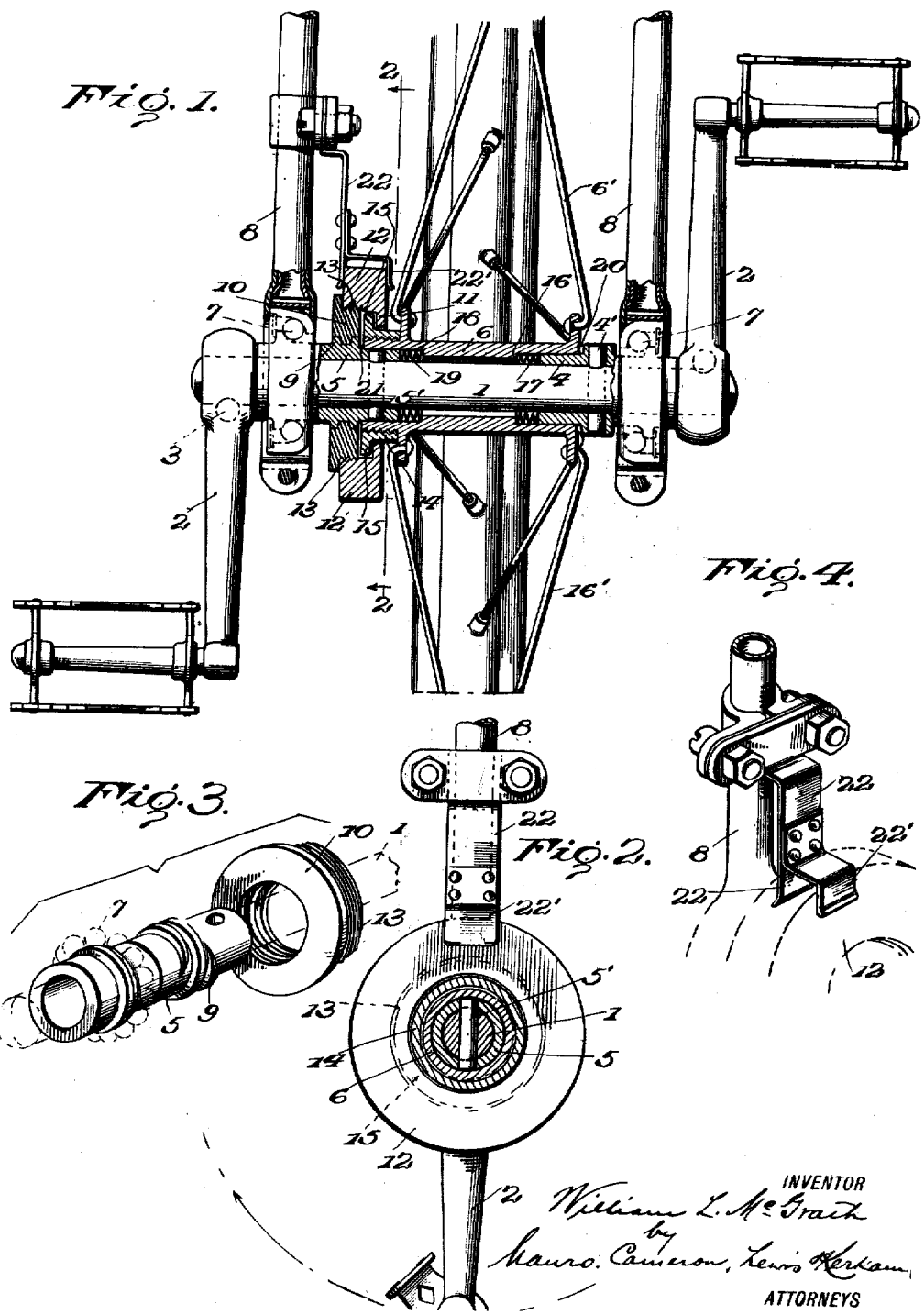

Patented June 17, 1924.

1,497,729

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

TRANSMISSION MECHANISM.

Application filed October 24, 1921. Serial No. 510,021.

*To all whom it may concern:*

Be it known that I, WILLIAM L. McGRATH, a citizen of the United States of America, and a resident of Elmira, New York, have invented new and useful Improvements in Transmission Mechanism, which invention is fully set forth in the following specification.

The present invention relates to power transmission devices, and has for one of its objects to provide a simple, durable, economical and efficient structure that may be readily assembled on either side of the driven member with which it is associated; that is "fool-proof" in installation and operation; that imposes no additional strain on the bearings of the driven member and requires no change in said bearings or their mountings; that imparts rotary movement to the driven member on rotation of the driving member in either direction; that transmits power from the driving to the driven member gradually and progressively; that retards or "brakes," through the power transmitting means, the movement of the driven member by reverse rotation of the driving member; and that applies the retardance or braking power gradually and progressively; and that permits the driven member to rotate freely in either direction.

The invention is particularly adapted for use in coaster brakes and the like, and finds peculiar application in connection with children's vehicles, as it enables such to be used in coasting, and to be driven both forwardly and backwardly, the same driving means being also used to "brake" the vehicle in either direction of travel, and the driving power and the braking power being gradually and progressively applied by the child in a simple, easy and natural manner.

While the invention is susceptible of a great variety of uses, it is herein shown, for purposes of illustration only, as applied to the axle of a vehicle.

The invention will be better understood by reference to the accompanying drawings illustrating one embodiment of the inventive idea, and wherein—

Fig. 1 is a vertical section through the improved transmission device showing the same mounted on the axle of a velocipede, some of the parts being in elevation;

Fig. 2 is a section on the line 2—2 of Fig. 1 looking in the direction of the arrows;

Fig. 3 is a pulled out view showing the mounting of certain elements of the device on the axle;

Fig. 4 is a detail perspective;

Fig. 5 is a modification showing a different form of retarding device and Fig. 6 is a detail;

Fig. 7 is a further modification showing another form of retarding device and a specifically different form of driving member, and Fig. 8 is a detail; and Fig. 9 is a modification showing another method of imparting movement to the driving member.

Referring to the drawings, wherein like reference numerals indicate like parts, 1 is the driving member here shown, by way of example, as the axle of a child's velocipede. To the extremities of this axle are secured pedal cranks 2 by means of the usual crank cotters 3. On one end of said axle is fixed a sleeve 4 by means of a key 4', and on the other end of said axle is keyed a sleeve 5 by means of a key 5'. The inner portions of these sleeves 4 and 5 are reduced in diameter as illustrated, and on these reduced portions is mounted, for rotation and axial movement, the driven member 6 here shown as the hub of a wheel to which the rim is laced by the usual spokes 6'. The axle is mounted in the usual ball bearings 7 carried by the forks 8.

The sleeve 5 is provided with a screw-threaded portion 9, a nut 10 engaging said screw-threads and being adapted to move longitudinally thereof and rotatably therewith as hereinafter described. This nut is provided with a flanged portion 11 which participates in all movements of said nut. As here shown, this flange is carried by a body portion 12 which is screw-threaded onto said nut at 13.

The hub 6 has mounted thereon an annulus 14 provided with a flange 15 which latter occupies the space between the nut 10 and the flange 11. This annulus is secured to the hub by any suitable means to participate in all of the movements thereof. As here shown, said annulus is screw-threaded thereon, so as to be readily secured thereto or removed therefrom.

Surrounding the axle 1 and interposed between the inner end of the sleeve 4 and a shoulder 16 on the hub is a resilient or yielding member, here shown as a plurality of cupped spring washers 17, and interposed between the inner end of the sleeve 5 and a shoulder 18 on the hub 6 are similar cupped spring washers 19. These spring members are not under initial pressure, but are arranged to resist any longitudinal or axial movement of the hub, and act to absorb the thrust of such axial movement. Accordingly, no additional or added strain is imposed on the bearings 7 by the use of the present invention, and these bearings are not required to be of greater capacity than in a machine not equipped with my invention.

As will be observed from the drawing, there is a definite clearance at 20 and 21 between the lateral extremities of the hub 6 and the sleeves 4 and 5, and a similar clearance between the flanges 11 and 15. The parts are illustrated in the position which they would occupy if the device was coasting down a hill and the driving member or axle was not rotating, as would be the case if the pedals were not being turned. The parts also occupy the position which they would assume if the device were at rest.

Assuming that the device is at rest and that it is desired to propel the same forwardly, rotation of the axle 1 by means of the pedals and cranks 2 will act to rotate the sleeve 5 and, by reason of the inertia of the parts, or the action of the spring 22 that engages the body portion 12, the nut 10 has imparted thereto an axial movement so that the face of the same is engaged with the face of the flange 15 with sufficient longitudinal pressure to frictionally clamp the surfaces together. As soon as this is effected, the nut 10 will rotate with the sleeve 5 and the driving member 1, and this movement of rotation will be imparted to the flange 15 and also to the hub 6 with which said flange is connected and forms a part, and the hub will be rotated in a clockwise direction. To prevent the engagement of the nut 10 with the flange 15 from initiating the rotation of the hub 6 violently and abruptly, I have provided means whereby the application of the driving force to the hub is gradually and progressively applied. As here shown, the spring washers 17 act to resist the axial movement of the hub 6 when the nut 10 engages the flange 15 and the take-up of the drive through the frictional engagement of said parts is cushioned by the compression of said spring washers. While the provision of this cushioning means is desirable in connection with forward driving, it is of particular importance where the same engagement of the nut 10 and flange 15 is effected for retarding or braking purposes.

When it is desired to coast, all that it is necessary to do is to stop the rotation of the shaft or axle 1 by ceasing to rotate it by means of the cranks and pedals, whereupon the continued rotation of the wheel and hub 6 in a forward direction causes the nut 10 to rotate in the same direction, thus automatically effecting disengagement between the adjacent surfaces of the nut 10 and the flange 15, and the hub 6 will then be released to freely coast on the sleeves 4 and 5.

If, now, while coasting down hill and with the wheel rotating in a clockwise direction, it is desired to bring about retardation or braking effect, a rotation of the shaft or axle 1 in a counter-clockwise direction will cause the collar 5 to rotate in a counter-clockwise direction and the nut 10 and the flange 11 will accordingly be moved toward the left as seen in Fig. 1, with the result that the adjacent faces of flanges 11 and 15 will be engaged, this frictional engagement being brought about by the longitudinal pressure exerted through the screw-threads 9. This action will result in a shifting of the hub 6 axially toward the left, as seen in Fig. 1, the pressure being cushioned by the compression of the cupped spring washers 19 so that the application of the frictional braking is gradual and progressive in its effect. This is a matter of great importance as, without the interposition of means for applying the braking pressure gradually and progressively, the braking power would be applied suddenly and abruptly, with danger to the child. By means of the present invention, the rotation of the wheel is under perfect control and it may be slowed or brought to a stop in an easy, natural and normal manner by simply back-pedaling.

If the wheel is being rotated backwards, or if the child is coasting backwardly down a hill, the speed of the wheel may be retarded or the wheel brought to rest by rotating the shaft or axle 1 in a clockwise direction, in which event the adjacent faces of the nut 10 and the flange 15, which were formerly engaged for forward driving, would again be engaged to effect the retarding or braking action. In the latter case, the cupped springs 17 would act to effect the gradual and progressive application of the braking force.

In many instances, the inertia of the nut 10 and its associated member 11 and 12 will be sufficient to insure the longitudinal or axial displacement of the same to effect either the driving or the braking action described, but in other instances it may be desired to positively insure this longitudinal displacement of the nut 10, in which event I may employ the light spring 22 to which reference has heretofore been made. As shown, this spring 22 may be carried by one of the forks 8 and is provided with a flange portion 22' that engages one face of the element 12, the lower end of the spring 22 engaging the other face of said element. The provision of some means for positively insuring the axial displacement of the nut 10 is desirable where the presence of oil, water, dirt or other foreign substances is to be provided against.

Various other means for insuring this displacement of the nut 10 may be utilized as shown in Figs. 5, 6, 7 and 8.

In Fig. 5 is shown a plunger 23 carried by a casing 24 on the fork 8. A coiled spring 25 forces the plunger into engagement with serrations 26 formed in a flange 27 on the nut 10. It will be observed that, after a slight longitudinal movement of the flange 27 either to the right or to the left, the plunger 25 will be disengaged therefrom so that the parts will revolve freely. Fig. 6 is a face view of the flange 27.

In Figs. 7 and 8, the nut 10 is shown provided with serrations 28 in the face thereof which are engaged by a button 29 carried by a spring 30 which is secured in any suitable manner to the fork 8, as by screws 31. A slight movement of the nut 10 toward the right will cause the disengagement of the button 29 from the serrations 28 so that, in the normal driving movement, the parts will be disengaged and, in this position, driving or rotation will be free of any clicking drag. In reverse driving, there would be a clicking drag.

This modification, instead of utilizing the driving axle 1 with cranks 2 on the ends of the same, employs cranks 2 provided with extensions 32 which are square in cross-section and which engage a sleeve 33 that in turn is engaged by the sleeves 4 and 5 heretofore described. This structure permits of the assembling of the hub 6 and cooperating parts so that they may be placed between the bearings and the other parts then assembled through either side, on the principle of what is known as the "knock out axle" type.

Fig. 9 is similar to Fig. 1, except that, in place of driving the axle 1 by means of pedals, as is usual in velocipede constructions, I here drive the axle through the sleeve 4″ by means of a sprocket 34 which is secured thereon in any suitable manner. As here shown, this sprocket is screw-threaded onto the sleeve 4″, with one face engaging a flange 35 on the sleeve 4″. The sprocket is held in place by a lock nut 36. This sprocket may be driven by any suitable means, for example a chain running to another sprocket driven by pedal cranks as in the case of the usual form of bicycle.

The arrangement and mounting of the improved device is such that the assembly may be reversed and the sleeve 5 and the nut 10 and its associated parts located at the right-hand side of the hub, if desired. It is immaterial, for the purposes of the present invention, whether the thread 9 on the sleeve 5 be a right or a left-hand thread, since the action is precisely the same in either direction of rotation, and it is therefore pointed out that erroneous assembly of the device in the vehicle will have no detrimental effect. The device is, accordingly, one that does not require in its assembly and mounting highly skilled labor, and is therefore, to an exceptional degree, what might be called "fool-proof." Further, the provision of protective or cushioning members whereby the driving and braking power is gradually and progressively applied, insures a maximum of safety to the child or other user of the device and imparts an exceptional element of durability to the structure.

While, for the purposes of illustration, various embodiments of the inventive idea have been herein shown and described, it is understood that the invention is not limited thereto but that the inventive idea is susceptible of various mechanical expressions within the limits of the appended claims.

What is claimed is:—

1. In a transmission mechanism, a driving member and a driven member, mechanism adapted to impart rotary movement to the driven member on rotation of the driving member in either direction, and yieldable means interposed between said driving and driven member whereby the power from the driving member is gradually applied to the driven member in either direction of rotation.

2. In a transmission mechanism, a driving member, a driven member, mechanism adapted to impart rotary and axial movement to the driven member on rotation of the driving member in either direction, and yieldable means interposed between said driving and driven members whereby the power from the driving member is gradually and progressively applied to the driven member in either direction of rotation.

3. In a transmission mechanism, a driving member and a driven member arranged for relative rotary and axial movement, mechanism adapted to impart rotary and axial movement to the driven member on rotation of the driving member in either direction, and yieldable means coacting with the driving and driven members and normally retarding relative axial movement therebetween.

4. In a transmission mechanism, a driving member and a driven member arranged for relative rotary and axial movement, mechanism adapted to impart rotary and axial movement to the driven member on rotation of the driving member in either direction, and yieldable means interposed between the driving and driven members and forming a cushion therebetween on rotation of the driving member.

5. In a transmission mechanism, a driving member and a driven member arranged for relative rotary and axial movement, mechanism adapted to impart rotary and axial movement to the driven member on rotation of the driving member in either direction, said mechanism comprising a nut having threaded engagement with one of said members and movable on rotation thereof for engagement with means on the other of said members, and yieldable means coacting with the driving and driven members for normally retarding relative axial movement of said members, said yieldable means forming a cushion between the driving and driven members on rotation of the driving member in either direction.

6. The combination of a supporting frame, a driving member and a driven member mounted for relative rotation on said frame, transmission mechanism carried by said members and adapted to impart rotation to the driven member on rotation of the driving member in either direction, a member carried by said frame and engaging said transmission means to prevent rotation of the latter with said driving member.

7. In a transmission mechanism, a driving member and a driven member arranged for relative rotary and axial movement, and mechanism adapted to rotate the driven member and move the same axially on rotation of the driving member in either direction.

8. In a transmission mechanism, a driving member and a driven member arranged for relative rotary and axial movement, mechanism adapted to rotate the driven member and move the same axially on rotation of the driving member in either direction, and means interposed between the driving member and the driven member for normally retarding relative axial movement therebetween.

9. In a transmission mechanism, a driving member and a driven member arranged for relative rotary and axial movement, mechanism adapted to impart rotary and axial movement to the driven member on rotation of the driving member in either direction, yieldable means coacting with the driving and driven members and forming a cushion therebetween on rotation of the driving member in either direction, and means for preventing rotation of said mechanism with said driving member.

10. In a transmission mechanism, a driving member and a driven member arranged for relative rotary and axial movement, and mechanism adapted to impart rotary and axial movement to the driven member on rotation of the driving member in either direction, said mechanism being adapted to retard rotation of the driven member on reverse rotation of the driving member.

11. In a transmission mechanism, a driving member and a driven member arranged for relative rotary and axial movement, and mechanism adapted to rotate and move the driven member axially on rotation of the driving member in either direction, said mechanism providing for free rotation of the driven member in either direction without affecting the driving member.

12. In a transmission mechanism, a driving member and a driven member arranged for relative rotary and axial movement, and mechanism adapted to impart rotary and axial movement to the driven member on rotation of the driving member in either direction, said mechanism including frictional means on one of said members and movable thereby for engagement with frictional means on the other of said members.

13. In a transmission mechanism, a driving member and a driven member arranged for relative rotary and axial movement, mechanism adapted to impart rotary and axial movement to the driven member on rotation of the driving member in either direction, said mechanism comprising frictional means on one of said members movable on rotation thereof for engagement with frictional means on the other of said members, and yieldable means interposed between the driving and driven members and adapted to form a cushion therebetween on rotation of the driving member in either direction.

14. In a transmission mechanism, a driving member and a driven member, means for rotating said driven member on rotation of the driving member, said means comprising a flange on the driven member and means on the driving member axially movable thereby for engagement with either face of said flange, and yieldable means interposed between the driving member and the driven member.

15. In a transmission mechanism, a driving member and a driven member, means for rotating said driven member on rotation of the driving member, said means comprising a flange on the driven member and means on the driving member axially movable thereby for engagement with either face of said flange, and yieldable means interposed between the driving member and the driven member and adapted to form a cushion therebetween on rotation of the driving member.

16. In a device of the character described, the combination of a driving member, a pair of sleeves carried thereby, a driven member rotatable on said sleeves, means for moving said driven member axially with relation to said sleeves, and resilient members interposed between said sleeves and driven member for absorbing the axial thrust.

17. In combination, a driving member and a driven member, means for transmitting driving power in either direction to the driven member and applying braking action to the driven member by reverse rotation of the driving member, and resilient means interposed between the driving member and the driven member adapted to yieldingly apply the braking action to said driven member.

18. In a device of the character described, the combination of a driving member, a pair of abutments carried thereby, a rotatable driven member, means for moving said driven member axially with relation to said abutments, and resilient means interposed between said abutments and driven member for absorbing the axial thrust.

19. In a device of the character described, the combination of a driving member, a pair of abutments keyed thereto, a driven member rotatable on said abutments, means for moving said driven member axially with relation to said abutments, and resilient means interposed between said abutments and said driven member for absorbing the axial thrust.

20. In a transmission mechanism, a driving member and a driven member, mechanism adapted to impart rotary movement to the driven member on rotation of the driving member in either direction, yieldable means interposed between said driving and driven member whereby the power from the driving member is gradually applied to the driven member in either direction of rotation, and a device for retarding the rotation of said mechanism.

21. In a transmission mechanism, a driving member and a driven member arranged for relative rotary and axial movement, mechanism adapted to impart rotary and axial movement to the driven member on rotation of the driving member in either direction, yieldable means coacting with the driving and driven members and normally retarding relative axial movement therebetween, and a device for retarding the rotation of said mechanism.

22. In a transmission mechanism, a driving member and a driven member arranged for relative rotary and axial movement, mechanism adapted to rotate the driven member and move the same axially on rotation of the driving member in either direction, and a device for retarding the rotation of said mechanism.

23. In a transmission mechanism, a driving member and a driven member arranged for relative rotary and axial movement, mechanism adapted to impart rotary and axial movement to the driven member on rotation of the driving member in either direction, said mechanism being adapted to retard rotation of the driven member or reverse rotation of the driving member, and a device for retarding the rotation of said mechanism.

24. In a transmission mechanism, a driving member and a driven member arranged for relative rotary and axial movement, mechanism adapted to rotate and move the driven member axially on rotation of the driving member in either direction, said mechanism providing for free rotation of the driven member in either direction without affecting the driving member, and a device for retarding the rotation of said mechanism.

25. In a transmission mechanism, a driving member and a driven member arranged for relative rotary and axial movement, mechanism adapted to impart rotary and axial movement to the driven member on rotation of the driving member in either direction, said mechanism including frictional means on one of said members and movable thereby for engagement with frictional means on the other of said members, and a device for retarding the rotation of said mechanism.

26. In a transmission mechanism, a driving member, a driven member freely rotatable on said driving member, and means for moving said driven member along the driving member whereby said members are coupled to rotate together, said means comprising a flange on the driven member and a device surrounding said flange and normally spaced from its opposed faces, said device being threaded on the driving member and movable into engagement with said flange by rotation of the driving member in either direction.

27. In a transmission mechanism, a rotatable axle, a ground-engaging wheel mounted on said axle and normally free to rotate in either direction with respect thereto, and means for moving said wheel along the axle whereby the two are coupled to rotate together, said means comprising a flange on said wheel and a member surrounding said flange and normally spaced from its opposed faces, said member being threaded on the axle and movable into engagement with the flange on rotation of the axle in either direction, said flange and member being adapted to exert a braking action on the wheel by reverse rotation of the axle.

28. In a transmission mechanism, the combination of a prime mover and a driven member, means for transmitting driving power in either direction to the driven member and applying a braking action to the driven member by reverse rotation of the prime mover, and a device for retarding the rotation of said means.

29. In a transmission mechanism, the combination of a prime mover and a driven member, means for transmitting driving power in either direction to the driven member and applying a braking action to the driven member by reverse rotation of the prime mover and permitting free rotation of the driven member in either direction independent of the prime mover, and a device for retarding the rotation of said means.

In testimony whereof I have signed this specification.

WILLIAM L. McGRATH.